United States Patent [19]

Valente

[11] 4,174,655
[45] Nov. 20, 1979

[54] PNEUMATIC APPARATUS FOR THE ROTATION OF VALVE RODS

[76] Inventor: Domenico Valente, Via Porto Corsini 10, 20126 Milan, Italy

[21] Appl. No.: 819,423

[22] Filed: Jul. 27, 1977

[30] Foreign Application Priority Data

Aug. 27, 1976 [IT] Italy ................. 26614 A/76

[51] Int. Cl.² .......................... F01C 9/00; F16J 11/04
[52] U.S. Cl. ......................................... 92/122; 92/171
[58] Field of Search ............... 92/122, 171, 67; 91/376 A, 167 A, 339

[56] References Cited

U.S. PATENT DOCUMENTS

| | | | |
|---|---|---|---|
| 2,256,470 | 9/1941 | Peo et al. | 92/122 |
| 2,314,493 | 3/1943 | Guy | 92/122 |
| 2,316,356 | 4/1943 | Nette et al. | 92/122 |
| 2,966,144 | 12/1960 | Self | 92/122 |
| 2,984,221 | 5/1961 | Voorhees | 92/122 |
| 3,049,103 | 4/1962 | Dumm | 92/122 |
| 3,053,236 | 9/1962 | Self et al. | 92/122 |
| 3,180,178 | 4/1965 | Brown et al. | 92/122 |

*Primary Examiner*—Paul E. Maslousky
*Attorney, Agent, or Firm*—William Anthony Drucker

[57] ABSTRACT

A pneumatic apparatus for the rotation of a valve rod having a box-design body with a cylindrical seat, on the inner wall of which there is disposed a static resilient gasket, shaped so as to convert the said cylindrical seat to an almost 8-shaped configuration. In this manner, the cylindrical seat is divided into two half-chambers communicating with each other and each of them communicating with the inside, through cross tubular lines.

2 Claims, 2 Drawing Figures

PNEUMATIC APPARATUS FOR THE ROTATION OF VALVE RODS

This invention relates to a pneumatic blade apparatus, adapted for the rotation of the rods of throttle, ball valves and the like.

As well known, several systems are provided with valves, which regulate the flow of liquid and gas through lines and orifices. These valves may take on an endless number of positions, determining from the full interception to the free flow of the fluid a plurality of intermediate stages of the fluid partial flow. In the throttle and ball valves in particular the relative arrangement of the shutter relative to its seat is obtained by rotation within an arc of 90° of the shutter control rod. In order to eliminate the direct intervention of an operator, in view of changing the position of the valve shutter, generally pneumatically operating apparatuses have been developed, which actuate the shutter rod.

The apparatuses proposed and utilized for this purpose show, nevertheless, a complex structure with a low performance. In the apparatuses of well-known type the translational motion is converted to a rotary motion and the rod is actuated by a sprocket and toothed rod kinematic mechanism. The object of this invention is to provide a pneumatic apparatus for the rotation of the valve rod having a simple structure and good performance.

It has now been found, and this forms the object of this invention, that this object is attained by a pneumatic actuating apparatus, consisting of a casing, on the cylindrical inner face of which there is disposed a resilient gasket, shaped so as to bound a space of almost 8-shaped configuration. In this manner, there are provided two half-chambers communicating with each other and each of them communicating with the inside, through cross tubular lines.

The end wall of the casing is further provided with a central hole, which serves as a bearing for the end of a pin, carrying two radial blades lying in the same plane.

The vertical edges of such blades are in contact with the cylindrical sectors of the gasket and divide each half-chamber into two sectors.

The blade carrying pin is provided with with transverse cross through-holes, disposed in different, horizontal, parallel planes and oriented so as to bring the opposite sectors of two half-chambers into communication.

The first casing is closed by a second casing having substantially an equal configuration and provided with a central through-hole, through which the opposite end of the pin protrudes. With the said pin end these may be coupled the rod of the valve to be actuated.

The pneumatic apparatus according to the present invention has therefore, of two half-chambers, connected with each other, into which there is inserted a driving blade. Therefore, the pneumatic apparatus of this invention shows a considerable ease of assembly, maintenance and inspection, which operations may be carried out by unskilled labour. The operation of the pneumatic apparatus of this invention is quite simple: in actual fact, by admitting a fluid under pressure via an elastic valve, into one of the two sectors of the cylindrical seat, through the posts there is provoked the rotation in a determined rotation of the blades and consequently of the pin, which in turn actuates the rod carrying the valve shutter.

Since the fluid admitted into a sector is delivered through the holes, drilled transversally to the pin on the opposite sector by acting on the corresponding face of the other blade, the pressure exerted by the fluid is exploited over both blades, so as to obtain the maximum performance of the apparatus. Furthermore, the power being supplied by a fluid being directly converted to a rotary motion, there is attained a high performance with a minimum overall dimension.

The perfect operation of the pneumatic apparatus of this invention is further ensured by the fact that the sealing gasket is stationary, and consequently subjected to low stresses. Of course, the pneumatic apparatus of this invention may be advantageously employed to carry out any rotary motion of 90°, irrespective of it being partially obtained.

The characteristic features of a functional and constructional nature of the pneumatic apparatus according to this invention, particularly adapted for throttle or ball valves will better be understood from the following detailed description, when taken in conjunction with the figures on the accompanying drawings, representing a preferred but non-limiting embodiment form given by way of example of this invention, and in which.

Figure 1:
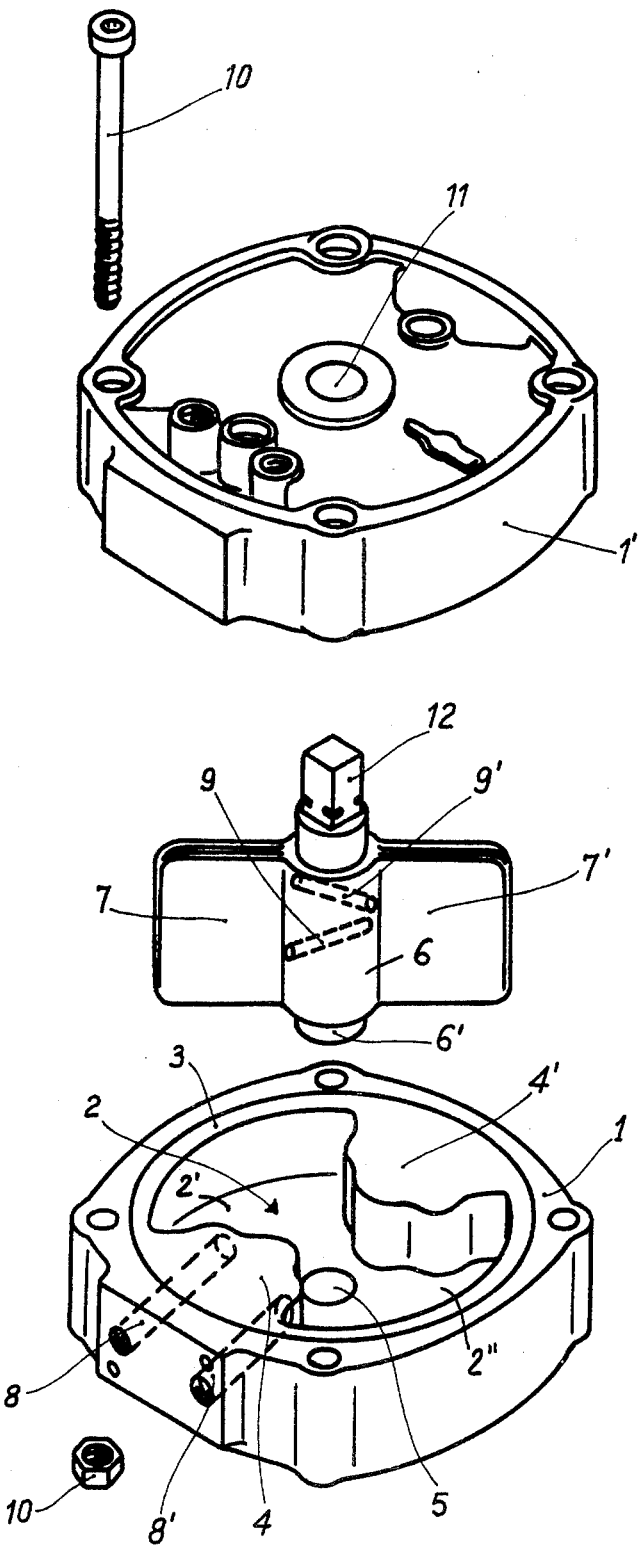
FIG. 1 shows the pneumatic apparatus of this invention in exploded view.

Referring now particularly to the figures on the accompanying drawings, the pneumatic apparatus of this invention consists of a first casing 1, the side wall of which has a cylindrical inner face bounding seat 2.

On the wall of the said casing there is applied by well known processes a resilient annular sealing gasket 3, having a diametrally opposed positions two internal expansions 4 and 4', so as to define a space having an almost 8-shaped configuration. The end wall of casing 1 is provided at its central part with a hole 5, which serves as a bearing for one of the ends 6', of a pin 6, on which there are secured two radial blades 7 and 7' lying in the same plane.

The expansions 4 and 4' divide the space into two half-chambers 2' and 2", communicating with an electric valve (not shown in the figure) respectively via the ports 8 and 8'. The blades 7 and 7' divide each of the half-chambers 2' and 2" into two sectors.

Transversally of the pin 6 there are provided two through-holes 9 and 9', lying in different, horizontal and parallel planes and oriented so as to bring two opposite sectors of the half-chambers 2' and 2" inot communication with each other.

To the casing 1 there is superposed and secured, preferably by means of bolts 10, a second casing having the same shape as the casing 1.

The casing 1' has a centrally positioned, through-hole 11 from which the end 12 of the pin 6 protrudes and the end can be coupled with the rod of the valve to be actuated.

The operation of the pneumatic apparatus of this invention is as follows:

by admitting compressed air from the port 8', this enters the sector of the half-chamber 2' comprised between the radial blade 7' and the expansion 4', then through the hole 9' it flows into the opposite sector of the half-chamber 2".

Figure 2:
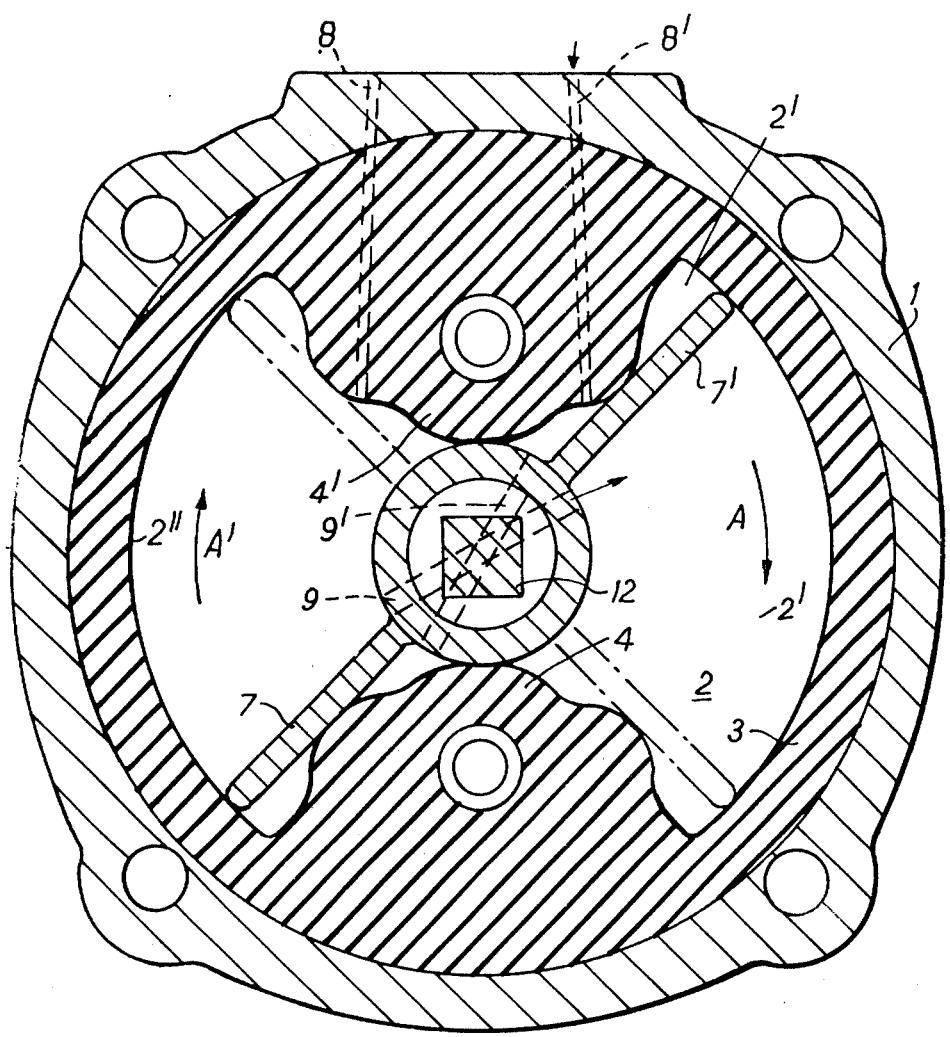
FIG. 2 represents in a schematic form the operation of the pneumatic apparatus given in FIG. 1.

The air pushes then the two radial blades 7 and 7', causing the pin 6 to turn in the direction of the arrows A,A' in FIG. 2. The discharge of the air from the opposite sectors occurs through the hole 9 and the port 8. Just on the contrary, when compressed air enters the port 8, the actuator or pin 6 turns in the contrary direction.

From the foregoing description and from perusal of the figures on the accompanying drawings one may easily see the functional character and simple construction characterising the pneumatic apparatus according to the present invention.

Several changes and modifications may be introduced in the pneumatic apparatus of this invention without departing from the scope of this invention as defined by the appended claims.

What I claim is:

1. A pneumatic rotary actuator for operation of a valve, comprising:
   (i) a first casing having a side wall with a cylindrical internal face, and having an end wall with a central hole;
   (ii) a resilient annular sealing gasket disposed within and secured to the side wall of the casing, said gasket having two diametrically opposed internal expansions so as to define, within said casing, a cavity having an approximately 8-shaped configuration including two half-chambers, said casing side wall including two inlet and outlet ports each opening into a respective one of said half-chambers;
   (iii) a pin having one end journalled in said central hole of the casing end wall and carrying two radial blades lying in the same plane, and the vertical edges of which blades are in contact with said sealing gasket, said blades dividing each half-chamber into two sectors, said pin having two through-holes disposed on different horizontal parallel planes and oriented so as to provide communication between two opposite sectors of the half-chambers, and
   (iv) a second casing secured to said first casing and having a central through-hole in which the protruding other end of said pin is journalled.

2. A pneumatic rotary actuator, as claimed in claim 1, wherein said second casing is secured to said first casing by bolt means.

* * * * *